Feb. 23, 1965  A. KRYNYTZKY  3,170,351
SHEAR FOR BILLETS AND THE LIKE
Filed Nov. 28, 1960  5 Sheets-Sheet 3

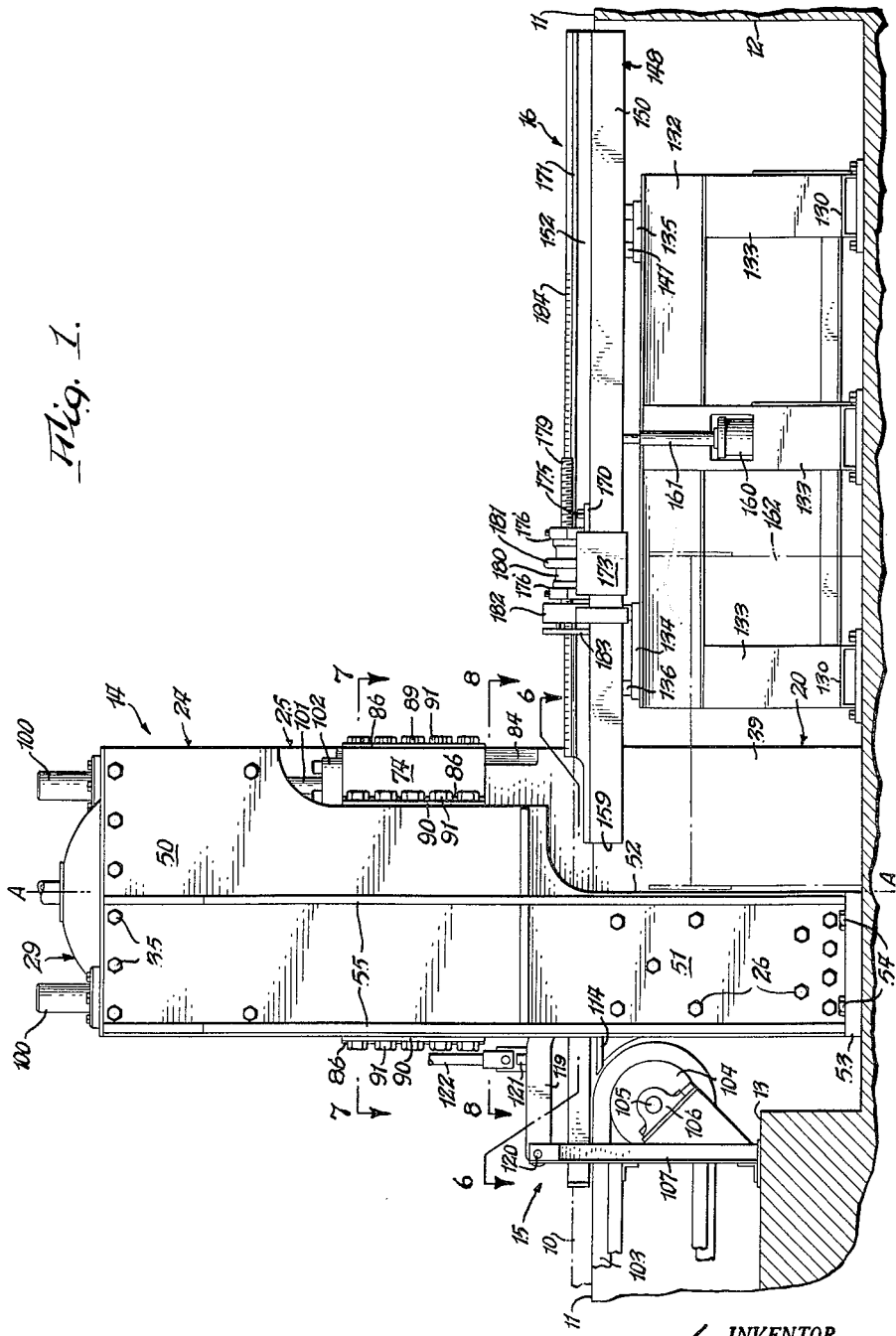

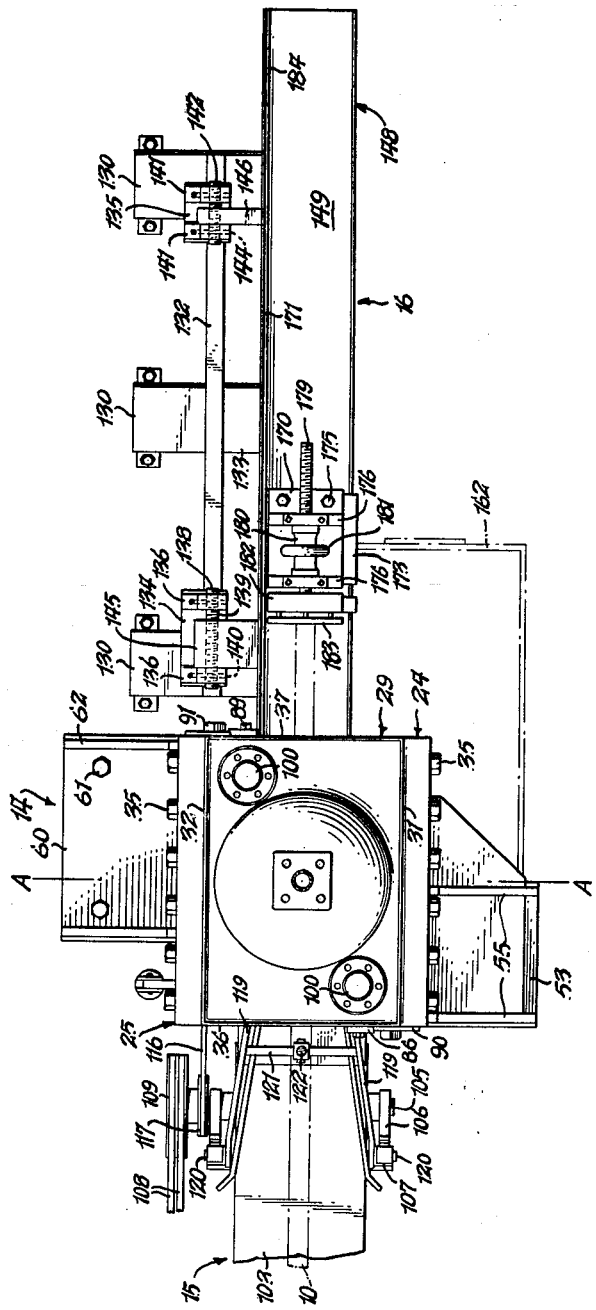

INVENTOR.
Alexander Krynytzky
BY
Poppe and Sommer
ATTORNEYS.

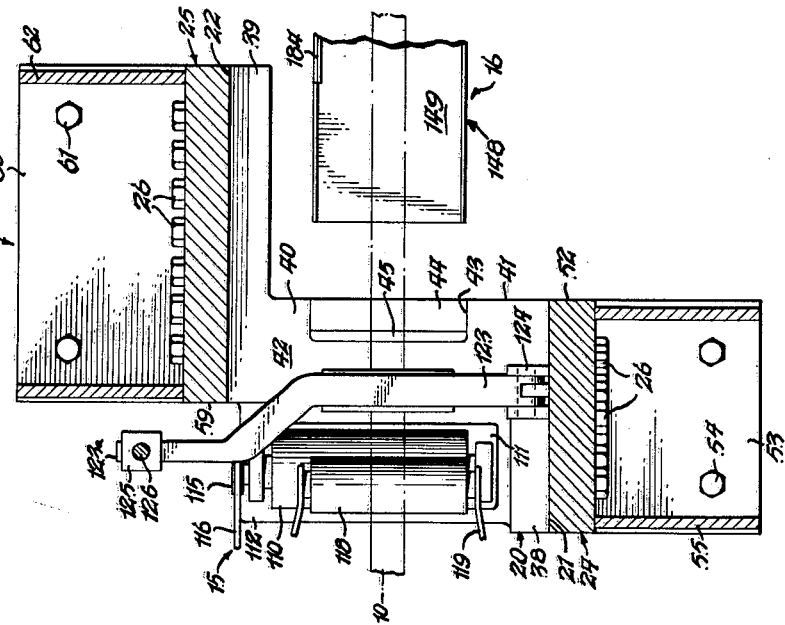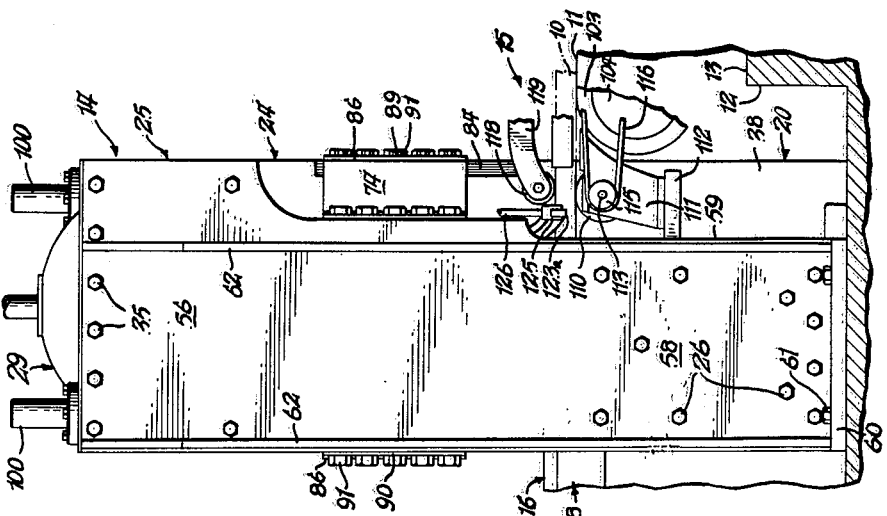

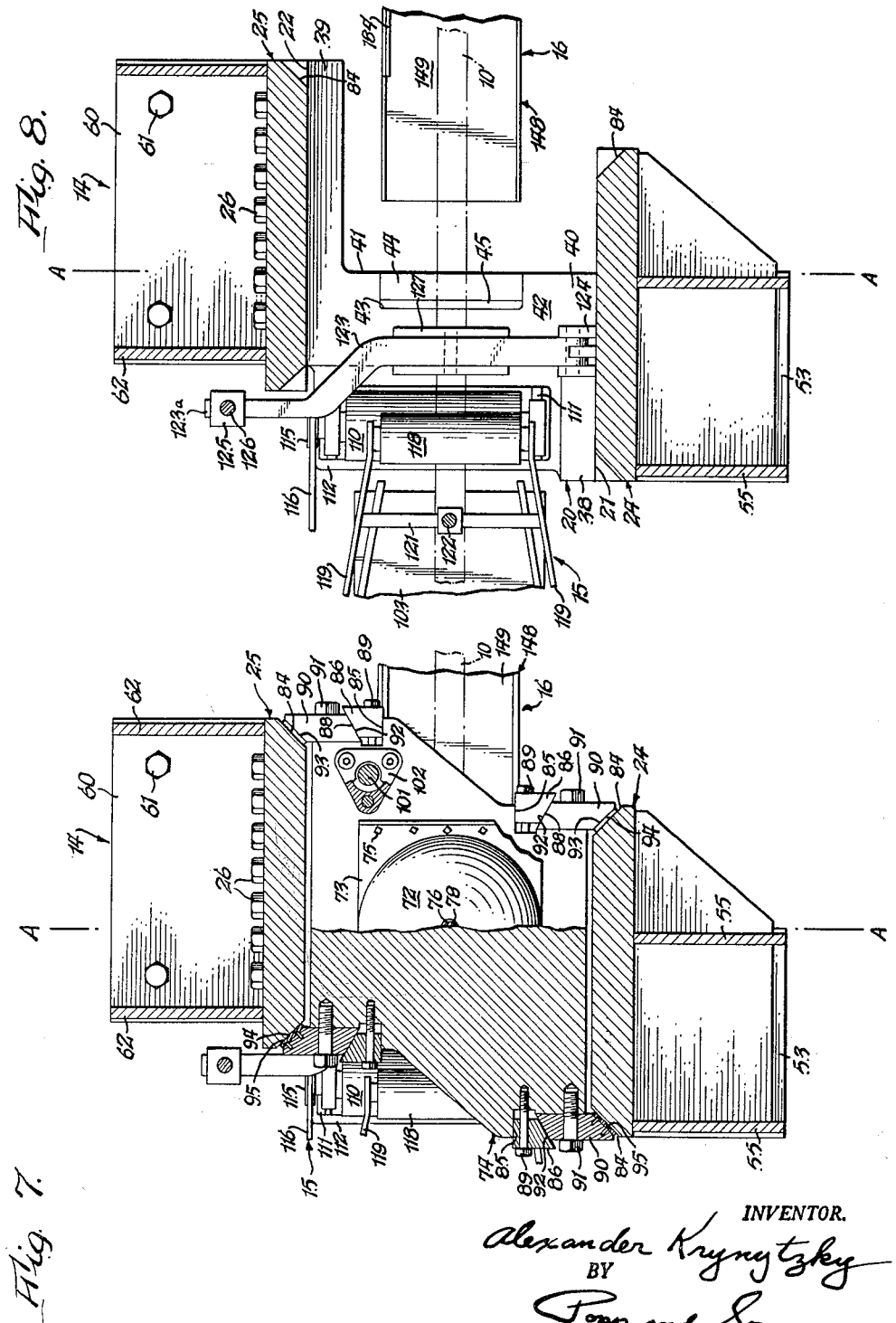

United States Patent Office 3,170,351
Patented Feb. 23, 1965

3,170,351
SHEAR FOR BILLETS AND THE LIKE
Alexander Krynytzky, Ebenezer, N.Y., assignor, by mesne assignments, to Baldwin-Lima-Hamilton Corporation, Philadelphia, Pa., a corporation of Pennsylvania
Filed Nov. 28, 1960, Ser. No. 72,101
14 Claims. (Cl. 83—157)

This invention relates to a hydraulic shear and more particularly to a heavy duty shear for cutting billets and the like.

An important object of the invention is to provide a rapid and positive sideways discharge of the part cut from the billet and to provide full accessibility and visibility of the billet and part cut therefrom at all times.

Another important object is to provide such a shear which will handle short pieces fed to the cutting blades, a holddown arm, as well as a pair of traction rollers, being provided very close to the shearing plane on the feeding side thereof so as to insure reliable positioning and holding of the pieces to be cut even when short.

Another object is to provide such a shear having substantially direct sideways discharge of the part cut from the billet this being achieved by the provision of a frame having side plates each having a leg portion and the leg portions being offset with reference to each other so that one leg portion has its surface on the discharge side of the shear bounded by the shearing plane to permit of such substantially direct sideways discharge of the part cut from the billet. This offset relation of the side plates also provides room for mounting the holddown or clamping arm for the billet to be sheared close to the shearing plane so as to effectively hold the billet being sheared practically at the shearing plane and permit of effectively holding and cutting very short pieces.

Another aim is to provide a simple and effective tilt table or holder which in its upright position receives the part cut from the billet and following the cut immediately tilts to move the cut part sideways in a horizontal direction and to discharge it into a box or other receiver.

Another aim is to provide such a tilt table or receiver which moves to clear the part cut from the billet from the cutting blades and frame of the shear, the tilt table or holder for this purpose working on a screw mounting which causes a small axial movement of the tilt table or receiver away from the blades and frame parts as it tilts.

Another purpose is to provide such a tilt table or receiver which drops the part cut from the billet almost directly below the centerline of the shear.

Another aim is to provide a manually set stop gage for determining the length of the part cut from the billet and which includes a stop in the path of the billet which can be set very close to the shearing plane thereby to cut off short pieces from the billet with a high degree of accuracy.

Another aim is to provide a simple and effective connection between the moving platen and the ram of the shear which permits the moving platen to be guided from its sides without danger of binding or malfunctioning, this being achieved by the provision of mating spherical faces between the moving platen and ram and by the provision of an oversize hole around the screw connecting these parts so that these parts can move relative to each other about these spherical faces.

Another object is to provide a simple and effective gib and bar guide for the moving platen which can be easily adjusted to insure proper aim or register of the moving platen with a high degree of accuracy.

Another aim is to provide a shear supplied with billets by a floor level pallet type conveyor so that the conveyor does not materially interfere with normal cross traffic, especially when the shear is not in use.

Other objects and advantages of the invention will be apparent from the following description and drawings in which:

FIG. 1 is a side elevational view of a hydraulic billet shear embodying the present invention.

FIG. 2 is a top plan view thereof.

FIG. 3 is a rear elevational view thereof.

FIG. 4 is a fragmentary vertical longitudinal section taken generally on line 4—4, FIG. 3.

FIG. 5 is a fragmentary side elevational view thereof viewed from the side opposite that shown in FIG. 1.

FIGS. 6, 7 and 8 are fragmentary horizontal sections taken on the correspondingly numbered lines on FIG. 1.

The hydraulic shear of the present invention is a heavy duty shear, such as a 300 ton shear, designed for shearing metal billets 10, illustrated in broken lines, which are fed to the hydraulic shear at the level of the floor indicated at 11. To this end the several sections of the hydraulic shear are set into a rectangular pit 12 having a step or elevated portion 13 at one end.

The hydraulic shear is shown as composed of three main sections or units, these being the shear section 14, the feed conveyor and holddown section 15 supplying the billets to be sheared to the shear section 14, and the cut-off table and gage section 16 on the side of the shear section 14 opposite from the feed conveyor and holddown section 15.

The shear section 14 is shown as constructed as follows:

The frame of the shear section comprises a bottom platen indicated generally at 20 and having vertical side faces 21 and 22 each interrupted by an integral outwardly projecting horizontal key 23. A feature of the invention resides in these faces 21, 22 being offset horizontally with reference to each other, fore-and-aft of the machine, for a purpose which will presently appear. Vertical side wall plates 24, 25 are secured, as by stud bolts 26, to these side faces 21, 22 respectively, and these side plates are provided with horizontal keyways 28 in which the keys 23 are fitted. A top cylinder platen 29, generally in the form of a rectangular block, has opposite parallel vertical faces 31, 32 fitting the opposing faces of the side wall plates 24, 25 and has integral horizontal keys 33 projecting outwardly from the faces 31, 32 into keyways 34 provided in the side wall plates 24, 25. The top cylinder platen 29 is shown as secured to the side wall plates 24, 25 by stud bolts 35 and is spaced from the bottom platen 20 to provide a working space defined by the side wall plates and platens. The front and rear faces of the top cylinder platen are indicated at 36 and 37, respectively.

The bottom platen 20 has spaced side walls 38, 39 connected by a vertical cross wall 40 having a vertical face 41 which is shown as disposed substantially in the vertical shearing or working plane of the billet shear and which is indicated at A—A. The top face of the bottom platen is indicated at 42, the billets to be sheared travelling on this top face. The side walls 38, 39 are offset horizontally with reference to each other as best shown in FIG. 6, the side wall 38 being disposed wholly on the side of the shearing plane A—A toward the feed conveyer and holddown section 15, and the side wall 39 intersecting this shearing plane A—A but being arranged principally on the side thereof toward the cut-off tile table and gage section 16 for a purpose which will presently appear.

The bottom platen 20 is recessed, as indicated at 43, to support a horizontal stationary shear blade 44 this recess being rectangular and being in the top and vertical faces 42, 41 of the bottom platen. The working face of the stationary shear blade 44 is substantially in the shearing or working plane A—A and is held in a holder or backup block 45. The shear blade is secured by bolts 46 which extend through the blade 44, blade holder 45 and cross wall 40 of the bottom platen, and the holder 45 is shown as additionally held by bolts 48 anchored in the bottom platen.

A feature of the invention resides in the form of the side wall plates 24 and 25, particularly of the side plate 24. Thus, fore-and-aft of the machine, the side plate 24 has a relatively wide top part or head 50 and a relatively narrow bottom part or leg 51, the top part 50 being coextensive with the side face 31 of the top cylinder platen 29 to which it is secured by the stud bolts 35 and the bottom part or leg 51 having a part of its edge face 52 on the discharge side of the shear arranged substantially in the shearing or working plane A—A of the machine. This edge face 52 extends above the fixed shearing blade 44 in the direction of approach of the movable shearing blade to permit the immediate discharge of the piece cut from the billet with its sheared face following said shearing plane and passing along and in close proximity to the edge surface 52 of the side plate 24. The side plate 24 has a bottom flange 53 secured by bolts 54 to the floor of the pit 12 and is reinforced by vertical external ribs 55.

Desirably, as best shown in FIG. 5, the other side plate 25, fore-and-aft of the machine, has a relatively wide top part 56 and a narrower bottom part or leg 58 thus providing on the feeding side of the shear a forwardly facing recess 59 in the lower part of the side plate 25 to provide clearance for moving parts of the shear. The side plate 25 has a bottom flange 60 secured by bolts 61 to the floor of the pit 12 and is reinforced by vertical external ribs 62.

The top or cylinder platen 29 has a downwardly opening cylinder or bore 65 containing the vertically moving cylindrical main ram 66 of the shear, suitable packing 68, guide rings 69 and 70 and adjusting ring 71 being provided between the open end of the cylinder 65 and the main ram 66. The bottom face 77 of the ram is of concave or upwardly dished spherical form and fits against the upwardly convex spherical face 72 of a holder 73 for a moving platen 74, the spherical holder 73 being secured to the top face of the moving platen by screws 75 or in any other suitable manner. The spherical holder for the moving platen 73 is shown as secured to the main ram 66 by a stud bolt 76 anchored in and arranged concentrically with respect to the main ram and extending through an oversize hole 78 through the spherical holder to permit the moving platen 74 to adjust itself to any angular position permitted by the spherical faces 77 and 72. The moving platen 74 carries the moving cutting blade 80 secured, as by bolts 81, in a holder 82 which is secured to the moving platen 74 by screws 83 in addition to the bolts 81. The cutting edge of the moving shearing blade is arranged substantially in and follows the shearing plane A—A as the main ram 66, together with the moving platen 74, moves in the cylinder 65.

The moving platen 74 is guided by the frame side plates 24 and 25 to move vertically along the shearing plane A—A and for this purpose the upper parts of the legs 51, 58 of the side plates having vertical guide surfaces or ways 84 which converge toward the center of the shear. Opposing each of these guide surfaces or ways 84 the moving platen 74 has vertical perpendicular or abrupt shoulders 85 extending fore-and-aft of the shear. These shoulders 85 are severally engaged by gibs 86 which are of wedge form in horizontal section, each face 88 opposite from the face engaging the shoulder 85 being at an acute included angle to screws 89 which secure the gibs to the moving platen and which extend fore-and-aft of the shear. These gibs 86 are severally engaged by a plurality of vertical guides 90 which are secured to the moving platen by screws 91 and each guide 90 has an angular face 92 mating with the acute angular face 88 of a corresponding gib 86. The face 93 on the side of each guide 90 opposite from its angular face 92 is generally parallel with this angular face 92 and with the guide surface or way 84 which it opposes. Desirably a vertical liner 94 is interposed between each of the face 84 and 93 and is shown as secured by screws 95 to its guide 90.

It will be seen that upon drawing up the screws 89 the wedge face 88 of the wedge-shaped gib 86 forces the corresponding guide 90 horizontally outwardly toward the corresponding side plate 24 or 25. By such adjustment the moving platen 74 can be aimed or accurately adjusted to have the cutting edge of its moving shearing blade 80 accurately follow the shearing plane A—A and adjustment can also be made to compensate for wear of the liners 94.

The moving platen 74 is forced downwardly by the main ram 66 to perform its working stroke. Return upward movement of the moving platen is effected by vertical pull-back cylinders 100 suitably secured in diagonally opposite corners of the top cylinder platen 29 and having pistons fixed to piston rods 101 projecting downwardly from the cylinder platen and each secured to the top of the moving platen 74 by a suitable clamp roller 102.

The feed conveyer and holddown section includes a pallet type endless conveyer 103 set into the pits 12 on the step 13 thereof so that the upper surface of its upper operative stretch is even with the floor 11, this endless conveyer traveling around a pulley 104 fixed to a horizontal shaft 105 journalled in bearings 106 carried by a frame 107, this shaft being on an axis parallel with the shearing plane A—A, the upper stretch of the conveyer 103 also being even with the top surface 42 of the stationary bottom platen 20 as best shown in FIG. 4. A drive belt 108 around a pulley 109 fixed to the shaft 105 drives the endless conveyer 103.

Also as best shown in FIG. 4, the billet 10 leaving the upper stretch of the feed conveyer 103 rides over a power driven traction roller 110 journalled in a frame or holder 111 carried by a shelf 112 projecting from the bottom fixed platen 20 so that its horizontal axle or shaft 113 is parallel with the shearing plane A—A. The frame or holder 111 can be provided with an elevated shelf 114 between the upper parts of the pulley 104 of the pallet type conveyer 103 and the traction roller 110 to prevent pieces from falling therebetween. The traction roller 110 can be power driven to propel the billets 10 into the shear section 14 of the shear in any suitable manner as by the driven pulley 115, drive belt 116 and drive pulley 117 connecting the shafts 113 and 105 of this traction roller 110 and conveyer 103.

A companion holddown roller 118 is arranged above and parallel with this traction roller 110, this holddown roller 118 being journalled on the free ends of a pair of arms 119 which are journaled at 120 on the frame 107 of the pallet type conveyer 103 and extend horizontally toward the shear section 14 on opposite sides of the pallet type conveyer. To raise and lower the holddown roller 118, the arms 119 are shown as being cross connected by a bar 121 connected to a vertical shipper rod 122 at its center, the latter being raised and lowered by any suitable actuator (not shown).

A feature of the invention also resides in the provision of a clamping arm 123 which engages and clamps each billet 10 down on the top surface 42 of the stationary bottom platen 20 close to the shearing plane A—A. For this purpose this arm 123 extends horizontally from a pivot mounting 124 at one end, this pivot mounting being in the form of a bracket fixed to the top face 42 of the bottom platen 20 adjacent the side plate 24 and immediately in advance of the shearing plane A—A and having a horizontal pivot pin extending perpendicularly to this plane and supporting the end of the holddown arm 123. As best shown in FIG. 8, the outer end 123a of this holddown arm is offset to extend along the vertical edge of the side plate 25 on the feeding side of the shear, this offset being in the recess 59 for this purpose as best shown in FIG. 5. This free end 123a is connected by a knuckle 125 with a vertical shipper rod 126 which can be connected to any suitable actuator (not shown). At its center a holddown shoe or rocket 127 is pivoted to the holddown arm 123 so as to effect broad surface engagement with the top of the billet being sheared when the holddown arm is forced downwardly by the shipper rod 126 to clamp the billet on the top surface 42 of the stationary bottom platen 20.

The cut-off table and gage section 16 is carried by a frame including several base plates 130 bolted to the floor of the pit 12; uprights 131 extending upwardly from these base plates; a horizontal channel beam 132 connecting the upper ends of these uprights 131; and diagonal braces 133. Bearing brackets 134 and 135 are fixed to and project upwardly from opposite ends of the horizontal channel beam 132. The bearing bracket 134 has upright ears 136 at its opposite ends in which is fixed a bearing member 138, this bearing member being in the form of a screw having a coarse or acme thread 139 between the two ears 136 and being held against turning by cross pins 140 or in any other suitable manner. Similarly, the bracket 135 has upright ears 141 in which the opposite ends of a coarse or acme threaded screw 142 is fixed, as by cross pins 144, this screw being coaxial with the screw 138.

On these coarse threaded or acme screws 138 and 142, respectively, is threadedly journalled the knuckles 145 and 146, respectively, of arms which carry a tilt table or receiver indicated generally at 148. This tilt table is in the form of a horizontal I-beam with one flange removed, having an elongated horizontal web 149 extending transversely of the shearing plane A—A, downwardly extending flanges 150 along its opposite longitudinal edges, and an upright flange 152 along that longitudinal edge facing the coarse threaded screws 138, 142 on which the table is journalled. In the elevated position of this tilt table, its web 149 is horizontal and in line with the top surface 42 of the bottom fixed platen 20 and its corresponding end 159 is in closely spaced relation to the fixed cutting blade 44 of the shear as best shown in FIGS. 1, 4 and 6. The tilt table is actuated by a piston within a cylinder 160, the lower end of which is pivotally connected to the center base plate at 130 and the piston rod 161 of which projects upwardly and is pivotally connected to the underside of the web 149 of the tilt table in any suitable manner. In the lowered position of the tilt table, the cut-off part of the billet is discharged from this table into a box or other suitable receiver 162, arranged close to the centerline of the shear as best shown in FIG. 3. In swinging from its elevated receiving to its lower discharging position the internally threaded knuckles 135 and 136, journalled and riding on the coarse threads of the screws 138 and 142, move axially a short distance along these screws in the direction to move the tilt table away from the bottom fixed platen 20. This is a feature of the invention and its purpose is to move the cut-off part of the billet away from the shear section 14 to insure that its cut-off face clears the surface 52 at the edge of the side plate 24 on the discharge side thereof.

A feature of the invention also resides in the manual gage for shearing the billets into pieces of any desired length. To this end the base of the gage comprises a slide plate 170 mounted on the web 149 of the tilt table and slidable longitudinally thereof. One edge of this slide plate is held down by small bar 171 welded to the upstanding flange 152 of the table. The opposite edge of the slide plate is continued downwardly as a flange 173 extending downwardly along the outer side of the corresponding depending side flange 150 of the tilt and is hook shaped, as indicated at 174, to hook under the lower edge of this depending flange 150. This sliding plate 170 can be fixed at any position along the tilt table by tightening a pair of set screws 175, the lower ends of which bear down upon the web 159 on the tilt table to clamp the slide plate in position.

The slide plate has a pair of bearing blocks 176 projecting upwardly from its opposite ends and in which a screw 179 is slidingly fitted so as to be capable of moving longitudinally in these bearing blocks. This movement is effected by a nut 180 on the screw shaft 179 held between the two bearing blocks 176 so as to be incapable of axial movement. This nut is turned by means of a hand wheel 181 and by turning the same, the screw shaft 179 is moved longitudinally of the bearing blocks 176 so as to adjust the position of the forward end of the screw shaft in relation to the shear section 14. This end of this screw shaft carries an abutment head 182 having a vertical transverse abutment plate 183 which forms a stop engaged by the billet to be sheared. This abutment head traverses a scale 184, graduated in feet and inches, on the upstanding flange 152 of the tilt table 148, this permitting the length gage to be set to cut off length of exact measurement.

*Operation*

In the operation of the shear, the billets 10 to be cut are placed upon the upper stretch of the pallet type feeding conveyer 103, this upper stretch being even with the floor 11 of the plant so as not to interfere with normal cross traffic especially when not in operation. This feeding conveyer is progressively advanced through the drive belts 108 and pulley 109 to bring the billets into the shearing plane A—A in preparation for which the holddown roller 118 is elevated by means of its vertical shipper rod 122; the clamping arm 123 is elevated by means of its vertical shipper rod 126; the ram 66 moving platen 74 and moving shear blade 80 are elevated by means of the pistons in the pullback cylinders 100; the tilt table or receiver 148 has been moved to its upper horizontal position by the piston in the hydraulic cylinder 161; a rough setting of the length gage has been made by loosening the set screws 175, moving the base plate 170 along the tilt table or receiver 148 to the desired position and retightening the set screws; and a fine adjustment of this length gage has been made by rotating the hand wheel nut 180, 181 to bring the head 182 and stop plate 183 to the exact distance from the shearing plane A—A desired.

As power from the main drive belt 108 is applied to the pulley 109 to advance the pallet type conveyer 103, the traction roller 110 is also rotated by means of the belt and pulley drive 117, 116, 115. When the billet on the pallet type conveyer 103 reaches its discharge end and travels onto this traction roller 110, the shipper rod 122 is moved downwardly to lower the arms 119 of the top holddown roller 118 and bring this top holddown roller into pressure contact with the billet to be sheared and to insure traction of the traction roller 110 in feeding this billet through the shearing plane A—A and against the stop plate 183 of the length gage 170. When the billet to be cut has been so properly positioned, the shipper rod 126 is forced downwardly to lower the holddown arm 123 and bring its shoe 127 into pressure contact with the billet to be sheared and hold it firmly seated on the top face 42 of the bottom fixed platen 20.

Hydraulic fluid under pressure is then introduced into the main ram cylinder 65 to drive the main ram 66 and moving platen 74 downwardly. This moves the moving shearing blade 80 downwardly along the shearing plane A—A through the positioned billet 10 and past the stationary shearing blade 44. After the billet has been so sheared the moving platen 74, together with the moving shear blade 80 and main ram 66 are raised by introducing fluid under pressure into the pullback cylinders 100. At this time the cut-off part is on the tilt table 148 and the other part of the billet is between the traction roller 110 and holddown roller 118 ready to be advanced for the next cut, this advance being effected by lifting the clamping arm 123 through its vertical shipper rod 126 and rotating the traction roller 110 through the drive belts 108 and 116 and pulleys 109, 117 and 113 as previously described.

Pressurized fluid is then applied to the cylinder 160 to draw its piston rod 161 downwardly. This lowers the tilt table 148, this tilt table pivoting around the stationary screws 138 and 142. Since the knuckles 140 and 146 of the tilt table 148 have threaded engagement with the coarse or acme threads of the two stationary screws 138, 142, this rotative movement of the tilt table 148 in so lowering causes it to move axially along these stationary screws. The threads of these stationary screws and knuckles are pitched so that this axial movement of the tilt table 148 is away from the shear section 14 of the shear. In consequence, the cut-off part of the billet is moved so that its sheared face clears the face 52 of the front plate 24, as well as the corresponding face 40 of the bottom fixed platen 20, as the tilt table swings downwardly and around the axis of the stationary screws 138, 142.

When the tilt table approaches the end of its downward movement it is at such angle or tilt that the cut-off part of the billet slides off into the box or receiver 162. Upon reversing the flow of fluid to the cylinder 160, the tilt table 148 is raised to its elevated horizontal position and upon lifting the clamping arm 123 through its vertical shipper rod 126 the parts of the shear are in the position assumed at the start of this description of the operation and ready for another shearing sequence.

From the foregoing it will be seen that by reason of the offset frame construction provided by the offset legs 51 and 58 of the side plates 24 and 25 the shearing is effected quickly and easily and the cut-off part is immediately discharged sideways to the receiver 162 which is almost under the center line of the shear, all these operations being performed with full visibility and accessibility at all times. It will also be seen that by virtue of this offset frame room is provided to locate and actuate the holddown arm 123 very close to the shearing plane A—A so that cuts can be made from very short billet ends. This is also permitted by the traction roller 110 and its associated holddown roller 118, these being located to advance such short billet ends through the shearing plane A—A and against the stop plate 138 of the length gage. It will be seen that this length gage is easily adjusted manually, a course adjustment being effected by loosening the set screws 175, sliding the slide plate 170 along the tilt table 148 to the desired position and retightening the set screws 175. A fine adjustment is achieved by simply turning the hand wheel 181 this rotating the nut 180 to advance or retract the stop plate 183. It will also be seen that the tilt table provides an extremely simple and rapid discharge for the cut-off part of the billet and that by virtue of the threaded connection of its knuckles 140, 146 and the stationary screws 138, 142, the table moves lengthwise while tilting sideways so that the sheared face of the part cut from the billet clears all structure of the shear while being discharged. The tilt table drops this cut-off part close to the center line of the shear.

It will also be seen that the gage stop 183 can be brought up very close to the shearing plane A—A to cut very short lengths from the billet. The spherical seat 71, 72 for the moving platen 74 permits it to be accurately aimed, and such aiming of this platen to insure exact registry of the shearing blades 44 and 80 is readily effected by the wedge gibs 86 for the guides 90 at the four corners of the moving platen. The location of the pallet type feed conveyer 103 at floor level also avoids undue interference with normal cross traffic in the plant.

I claim:

1. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen and extending transversely across said shearing plane, a moving platen guided by said side plates for movement along said shearing plane, a moving cutting blade mounted on said moving platen and having its cutting edge arranged substantially in said shearing plane, one of said side plates having its transverse edge surface at the discharge side of said shear substantially bounded by said shearing plane and extending from said fixed cutting blade in the direction of approach of said moving cutting blade, and movable means at said discharge side of the shear for receiving the part cut from said billet by said cutting blades and moving said cut part downwardly and away from said transverse edge surface of said one of said side plates for discharge from said shear.

2. A shear as set forth in claim 1 additionally including a bottom traction roller below the path of the billets to be cut and rotating on a horizontal axis generally parallel with and adjacent to said shearing plane, said bottom traction roller engaging the undersides of the billets to be sheared, a top traction roller above and parallel with said bottom traction roller and engaging the upper sides of the billets to be sheared and means supporting said top traction roller for vertical movement.

3. A shear as set forth in claim 2 wherein said last mentioned means comprises an arm rotatably supporting said top traction roller at its free end, and means pivotally supporting the other end of said arm to oscillate about an axis remote from said shearing plane and generally parallel with said last mentioned axis.

4. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen and extending transversely across said shearing plane, a cylinder platen arranged between and fixed to the ends of said side plates remote from said fixed platen and having a cylindrical bore opening toward said fixed platen on an axis substantially parallel with said shearing plane, a movable ram in said bore, a moving platen connected to said ram, a moving cutting blade mounted on said moving platen and having its cutting edge arranged substantially in said shearing plane, one of said side plates being indented to provide a transverse edge surface at the discharge side of the shear substantially bounded by said shearing plane and extending from said fixed cutting blade in the direction of approach of said moving cutting blade, and movable means at said discharge side of the shear for receiving the part cut from said billet by said cutting blades and moving said cut part downwardly and away from said transverse edge surface of said one of said side plates for discharge from said shear.

5. A shear for cutting billets or the like along a shearing plane, comprising a fixed bottom platen, a fixed cutting blade mounted on said fixed bottom platen with its cutting edge arranged substantially in said shearing plane, means feeding the billets to be sheared horizontally across the top of said fixed cutting blade from a feeding to a discharge side of the shear, vertical stationary frame side plates at opposite sides of said fixed bottom platen and extending transversely across said shearing plane, said side plates severally having top portions and leg portions with said leg portions offset with reference to each other transversely of said shearing plane, a top cylinder platen arranged between and fixed to said top portions of said side plates and having a downwardly opening cylinder bore with is axis substantially parallel with said shearing plane, a movable ram in said bore, a moving platen connected to the underside of said ram, a moving cutting blade mounted on said moving platen and having its cutting edge arranged substantially in said shearing plane, one transverse edge surface of one of said side plates being substantially bounded by said shearing plane and extending upwardly from said fixed cutting blade, and movable means at the discharge side of the shear for receiving the part cut from said billet by said cutting blades and moving said cut part downwardly and away from said transverse edge surface of said one of said side plates for discharge from said shear.

6. A shear for cutting billets or the like along a shearing plane, comprising a fixed bottom platen, a fixed cutting blade mounted on said fixed bottom platen with its cutting edge arranged substantially in said shearing plane, means feeding the billets to be sheared horizontally across the top of said fixed cutting blade from a feeding to a discharge side of the shear, vertical stationary frame side plates at opposite sides of said fixed bottom platen and extending transversely across said shearing plane, said side plates severally having top portions and leg portions with said leg portions offset with respect to each other transversely of said shearing plane, a top cylinder platen arranged between and fixed to said top portions of said side plates and having a downwardly opening cylinder bore with its axis substantially parallel with said shearing plane, a movable ram in said bore, a moving platen connected to the underside of said ram, a moving cutting blade mounted on said moving platen and having its cutting edge arranged substantially in said shearing plane, one transverse edge surface of one of said side plates being substantially bounded by said shearing plane and extending upwardly from said fixed cutting blade, movable means at the discharge side of the shear for receiving the part cut from said billet by said cutting blades and moving said cut part horizontally with its sheared face following said shearing plane in close proximity to said transverse edge surface of said one of said side plates for discharge from said shear, a billet holddown arm above the path of the billets to be cut and pivoted at one end to said one of said side plates adjacent said shearing plane about a horizontal axis arranged transversely of said shearing plane, and projecting toward the other of said side plates, a holddown shoe on said holddown arm and engageable with the top of the billet to be cut, and means on said other of said side plates for moving said holddown arm vertically into and out of clamping relation with said billet to be cut, said means maintaining said clamping pressure on said billet as it is cut.

7. A shear for cutting billets or the like along a shearing plane, comprising a fixed bottom platen, a fixed cutting blade mounted on said fixed bottom platen with its cutting edge arranged substantially in said shearing plane, means feeding the billets to be sheared horizontally across the top of said fixed cutting blade from a feeding to a discharge side of the shear, vertical stationary frame side plates at opposite sides of said fixed bottom platen and extending transversely across said shearing plane, said side plates severally having top portions and leg portions with said leg portions offset with respect to each other transversely of said shearing plane, a top cylinder platen arranged between and fixed to said top portions of said side plates and having a downwardly opening cylinder bore with its axis substantially parallel with said shearing plane, a movable ram in said bore, a moving platen connected to the underside of said ram, a moving cutting blade mounted on said moving platen and having its cutting edge arranged substantially in said shearing plane, one transverse edge surface of one of said side plates being substantially bounded by said shearing plane and extending upwardly from said fixed cutting blade, movable means at the discharge side of the shear for receiving the part cut from said billet by said cutting blades and moving said cut part horizontally with its sheared face following said shearing plane in close proximity to said transverse edge surface of said one of said side plates for discharge from said shear, a billet holddown arm above the path of the billets to be cut and pivoted about a horizontal axis to said one of said side plates adjacent to and on the feeding side of said shearing plane and having its free end arranged along the edge of the other of said side plates on the feeding side of the shear, a holddown shoe on said holddown arm and engageable with the top of the billet to be cut, and means on said other of said side plates for moving said holddown arm vertically into and out of clamping relation with said billet to be cut, said means maintaining said clamping pressure on said billet as it is cut.

8. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen, at least one of said side plates having a transverse edge surface at the discharge end of said shear substantially bounded by said shearing plane, a moving platen guided by said side plates for movement along said shearing plane, a moving cutting blade mounted on said moving platen and having its cutting edge arranged substantially in said shearing plane, movable means at the discharge side of the shear for receiving a part cut from said billet by said cutting blades and moving said cut part downwardly and away from said transverse edge surface of said one of said side plates for discharge from said shear, a billet holddown arm on the side of the path of the billets to be cut remote from said fixed cutting blade and pivoted at one end to one of said side plates adjacent said shearing plane about an axis generally perpendicular to said shearing plane and said billet holddown arm projecting toward the other of said side plates, a holddown shoe on said holddown arm and engageable with the billet to be cut, and means on the other of said side plates for moving said holddown arm into and out of clamping relation with said billet to be cut, said means maintaining said clamping pressure on said billet as it is cut.

9. A shear as set forth in claim 8 wherein said holddown arm extends transversely across one side of one of said side plates.

10. A shear for cutting billets or the like along a shearing plane, comprising a fixed bottom platen, a fixed cutting blade mounted on said fixed bottom platen with its cutting edge arranged substantially in said shearing plane, means feeding the billets to be sheared horizontally across the top of said fixed cutting blade from a feeding to a discharge side of the shear, vertical stationary frame side plates at opposite sides of said fixed bottom platen and extending transversely across said shearing plane, said side plates severally having top portions and leg portions with said leg portions offset with reference to each other transversely of said shearing plane, a top cylinder platen arranged between and fixed to said top portions of said side plates and having a downwardly opening cylinder bore with its axis substantially parallel with said shearing plane, a ram in said bore, means providing a vertical guideway at each transverse edge of each side plate whereby the guideways of one side plate are in offset relation to the guideways of the other side plate, a moving platen connected to the underside of said ram, vertical guide means on said moving platen engaging said first mentioned guide means on said side plates, a moving cutting blade mounted on said moving platen and having its cutting edge arranged substantially in said cutting plane, one transverse edge surface of one of said side plates being substantially bounded by said shearing plane and extending upwardly from said fixed cutting blade, and means at the discharge side of the shear receiving the part cut from said billet by said cutting blades and moving said cut part downwardly and away from said transverse edge surface of said one of said side plates for discharge from said shear.

11. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen and extending transversely across said shearing plane, a moving platen guided by said side plates for movement along said shearing plane, a moving cutting blade mounted on said moving platen and having its cutting edge arranged substantially in said shearing plane, one of said side plates having its transverse edge surface at the discharge side of said shear substantially bounded by said shearing plane and extending from said fixed cutting blade in the direction of approach of said moving cutting blade, a holder at the discharge side of the shear adjacent said fixed cutting blade receiving the part cut from said billet and means for moving said holder along but at a slight acute angle to said shearing plane whereby the sheared face of said cut part moves along but in closely spaced relation to said transverse edge surface of said one of said side plates for discharge from the shear.

12. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen and extending transversely across said shearing plane, a moving platen guided by said side plates for movement along said shearing plane, a moving cutting blade mounted on said moving platen and having its cutting edge arranged substantially in said shearing plane, one of said side plates having its transverse edge surface at the discharge side of said shear substantially bounded by said shearing plane and extending from said fixed cutting blade in the direction of approach of said moving cutting blade, a holder at the discharge side of the shear adjacent said fixed cutting blade receiving the part cut from said billet, screw means supporting said holder to rotate about an axis generally perpendicular to said shearing plane and below the part cut from said billet whereby rotating said holder about said axis moves said holder along said axis away from said shearing plane to move the cut part along but with its sheared face in spaced relation to said transverse edge surface of said one of said side plates, and means so rotating said holder to discharge the cut part from the shear.

13. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen and extending transversely across said shearing plane, a moving platen guided by said side plates for movement along said shearing plane, a moving cutting blade mounted on said moving platen and having its cutting edge arranged substantially in said shearing plane, one of said side plates having its transverse edge surface at the discharge side of said shear substantially bounded by said shearing plane and extending from said fixed cutting blade in the direction of approach of said moving cutting blade, a holder at the discharge side of the shear adjacent said fixed cutting blade receiving the part cut from said billet, movable means for moving said holder and said cut part downwardly and away from said transverse edge surface of said one of said side plates for discharge from said shear, and gage means mounted on said table and including a longitudinally calibrated rod arranged transversely of said shearing plane with its end in the path of the billet to be sheared, and means for finely and coarsely adjustably positioning said calibrated rod longitudinally with reference to said holder and shearing plane to determine the length of the piece cut from the billet.

14. A shear for cutting billets or the like along a shearing plane, comprising a fixed platen, a fixed cutting blade mounted on said fixed platen with its cutting edge arranged substantially in said shearing plane, means feeding the billets to be sheared across said fixed cutting blade from a feeding to a discharge side of the shear, stationary frame side plates at opposite sides of said fixed platen, a moving platen guided by said side plates for movement along said shearing plane, a moving cutting blade mounted on said moving platen and having its cutting edge arranged substantially in said shearing plane, at least one of said side plates having a transverse edge surface at the discharge side of said shear substantially bounded by said shearing plane and extending from said fixed cutting blade in the direction of approach of said moving cutting blade, and movable means at said discharge side of the shear for receiving the part cut from said billet by said cutting blade and moving said cut part downwardly and away from said transverse edge surface of said one of said side plates for discharge from said shear.

References Cited by the Examiner

UNITED STATES PATENTS

| 545,759 | 9/95 | Aiken | 83—639 |
|---|---|---|---|
| 680,937 | 8/01 | Ohl et al. | 83—468 |
| 722,265 | 3/03 | Swyers | 83—157 XR |
| 1,488,562 | 4/24 | Spaulding | 83—627 |
| 1,755,061 | 4/30 | Hegg | 83—112 |
| 2,324,751 | 7/43 | Williams et al. | 83—452 XR |
| 2,587,749 | 3/52 | Misson | 83—627 |
| 2,645,287 | 7/53 | Munschauer | 83—640 |
| 2,649,056 | 8/53 | Autenrieth | 83—112 |
| 2,693,235 | 11/54 | Kenworthy et al. | 83—282 XR |
| 2,778,421 | 1/57 | Munschauer | 83—640 |

ANDREW R. JUHASZ, *Primary Examiner.*

CARL W. TOMLIN, DONALD R. SCHRAN,
*Examiners.*